3,203,480
USE OF SULFIDES IN FLOODING WATER
H Robert Froning, Tulsa, Okla., assignor to Pan American Petroleum Corporation, Tulsa, Okla., a corporation of Delaware
No Drawing. Filed Mar. 18, 1963, Ser. No. 266,078
20 Claims. (Cl. 166—4)

This invention relates to the recovery of oil from oil-bearing earth formations. More particularly, it relates to water flooding such formations.

In water flooding oil bearing earth formations water is injected down an input well and into the formation. The water displaces oil from the formation toward a producing well through which the oil is recovered. Many additives, such as sodium carbonate, sodium hydroxide, phosphates and the like, have been proposed for use with the water to improve oil recovery. Some of these worked well in specific formations. A characteristic of the operation of additives in flooding water, however, has been that although certain additives may improve oil recovery from some reservoirs, these same additives do not improve recovery from other formations.

An object of my invention is to provide a new class of additives for use with flooding water to improve oil recovery together with means for determining in what formations and under what circumstances the additives are effective. Another object of the invention is to provide a method for recovering oil from a permeable solid material in which the solid material is contacted with water containing a class of additives in a concentration and at a pH capable of improving oil recovery from the solid material. Still further objects will be apparent from the following description and claims.

I have found that in some formations such as the Gallup formation of the Cha Cha Gallup field in New Mexico substantially neutral and alkaline sulfide salts of ammonium or the alkali metals in solutions about 0.2 to about 2.0 molar with respect to the salts will make the formations more water wet and will considerably increase oil recovery.

Sulfides, like other additives, are not effective in all formations. It is important, therefore, that before the sulfides are used in a water flooding operation a test should be made which will give some assurance that the additive will improve recovery of the specific oil from the particular formation in question. The best test probably consists of obtaining a true native state core and using this in the test. As a practical matter, however, it is generally sufficient to limit the test to obtaining a core of the formation in question, cleaning the core, saturating the core with substantially air-free crude oil from the formation, flooding the core with the flooding water available, and then flooding the core with the same water containing the sulfide salt. If additional oil recovery is obtained with the sulfide-containing solution, the solution would be shown to be potentially usable in the flooding operation.

Sometimes cores of the formation cannot be obtained. In such cases I have found a good test to be one involving measurement of the wettability of surfaces as similar as possible to those known to be present in the formation. Ordinarily these surfaces will be quartz, calcite, dolomite or silicates such as clays. Crystals of quartz, calcite and dolomite can be obtained and polished to provide smooth surfaces on which the measurement can be made. Since it is more difficult to obtain large dolomite crystals, it is customary to use calcite crystals to evaluate agents for use in dolomite reservoirs. A clay surface can be provided by wetting a polished surface of one of the crystals with an aqueous suspension of the clay, draining off excess suspension and allowing the surface to dry.

When the surface is prepared, it should be surrounded by water. Preferably the water should be that present in the formation. If this water is not available, a satisfactory substitute is water which has been in contact with the oil for a period of several days so materials soluble in both the oil and water have reached substantial equilibrium between the two phases. A drop of air-free crude oil from the formation is then placed on the crystal surface. The crude oil should be maintained air free to avoid partial oxidation of the crude which may form surface active agents not actually present in the crude oil and which might therefore produce misleading results.

The contact angle of the oil-water interface with the testing surface is measured repeatedly over a period of time long enough, usually many days, to insure that the contact angle has approached an equilibrium value. Contact angle measurements are usually made under conditions so that the water is caused to advance across the surface previously wet by oil. This is to accelerate reaching equilibrium. A more detailed description of such techniques is to be found in U.S. Patent 3,028,912. The water phase is then replaced by the proposed flooding water containing the sulfide salt and water-advancing contact angles are measured over a period of time. The contact angle using the sulfide-containing water is then compared to the contact angle using the natural or simulated formation water.

If the water wettability is increased in the presence of the sulfide-containing water, then this solution is potentially useable in the water flooding operation. An increased water wettability is indicated by a decrease in the contact angle as measured from the water side.

Best results are ordinarily obtained when the formation is originally preferentially oil wettable (contact angle over 90 degrees) and the sulfide solution makes the formation preferentially water wettable (contact angle less than 90 degrees). Some benefits have been obtained however, by simply increasing water wettability (decreasing the contact angle) although wettability reversal does not take place.

My invention will be better understood from the results of tests using air-free crude oil from the Cha Cha Gallup field in New Mexico. The oil was from the Gallup sand. Quartz crystals were used to provide the surfaces for contact angle measurements. A drop of the oil was placed between two crystal surfaces in contact with water which had been brought to equilibrium with the air-free crude oil. One quartz crystal was moved relative to the other so the surfaces in contact with the oil drop moved parallel to each other. This formed two contact angles where the water advanced and two where the oil advanced. Both water-advancing contact angles were measured, wherever possible, until they reached substantially equilibrium values. The water phase was then replaced with a prospective flooding water containing chemicals of various sorts, the crystals were moved again and the water-advancing contact angles were again measured. Results of the tests are presented in Table I.

*Table I*

| Test No. | Chemical | Molarity | pH | Contact angle Before | Contact angle After |
|---|---|---|---|---|---|
| 1 | Ammonium carbonate plus | 0.5 | 9.5 | 110-103 | 65-62 |
|  | Ammonium sulfide | 0.5 |  |  |  |
| 2 | Sodium sulfide | 0.5 | 8.5 | 116-119 | 65-40 |
| 3 | Sodium polysulfide | 0.5 | 8.5 | 116-83 | 57-47 |
| 4 | Ammonium sulfide | 0.4 | 9.4 | 112-103 | 87-82 |
| 5 | Ammonium sulfide plus | 0.2 | 9.2 | 98 | 82 |
|  | Amomnium carbonate | 0.2 |  |  |  |
| 6 | Ammonium sulfide plus | 0.5 | 9.5 | 104 | 74-77 |
|  | Ammonium carbonate | 0.5 |  |  |  |
| 7 | Phosphoric acid | 0.5 | 4.0 | 145 | 75 |
| 8 | Sodium aluminate | 0.5 | 12.4 | 87 | >160 |
| 9 | Sodium carbonate plus | 0.5 | 11.0 | 93-112 | >150 |
|  | Sodium sulfite | 0.5 |  |  |  |
| 10 | Ammonium sulfide plus | 0.5 | 12.3 | 65-62 | 124 |
|  | Ammonium carbonate | 0.5 |  |  |  |

Tests 1, 4, 5 and 6 show the effectiveness of ammonium sulfide with or without ammonium carbonate for greatly increasing the water wettability of the quartz surface in the presence of Cha Cha Gallup crude oil. The low value of the contact angle in Test 5 before the treatment was due to the surface having been previously used in Test 4. Re-use of the crystals in this way, without re-polishing has been found to be satisfactory in many cases at least for qualitative screening purposes. Tests 1 and 6 are duplicate runs. They show how nearly the results can be duplicated. A comparison of Tests 5 and 6 shows that as the concentration of sulfides is decreased, the effectiveness for increasing water wettability becomes smaller, therefore, it is not advisable to use a concentration less than about 0.1 molar with the sulfide salt and preferably not less than about 0.2 molar. It will be understood that when reference is made to a sulfide salt this may be a single salt or a mixture of two or more ammonium and alkali metal salts including sulfides, bisulfides and polysulfides. Test 10 shows the pH should be below about 12. Preferably it should be below about 10 for best results with Cha Cha Gallup crude oil. With this crude oil, the pH should be at least about 8.0 in order to maintain a high ratio of hydrosulfide ions to unionized hydrogen sulfide. In some cases the pH may be as low as about 6, and with some crude oils the pH may be considerably above 12. In all cases the pH should be at least about 6.0. Otherwise, too much of the sulfide is present as hydrogen sulfide rather than as a sulfide salt.

Tests 2 and 3 in Table I show sodium sulfides are as effective as ammonium sulfides for reversing the wettability of quartz wet with Cha Cha Gallup crude oil.

Test 7 indicates the effectiveness of phosphoric acid for reversing the wettability of the quartz with Cha Cha Gallup crude oil. It should be noted, however, that if calcium carbonate is present in the formation, as it usually is, it will not be possible to maintain such a low pH. In addition, phosphoric acid and the phosphate salts are rapidly lost from the solution due to adsorption and reaction except under special circumstances.

Tests 8 and 9 of Table I show the ineffectiveness of aluminates and sulfites, at least at high pH, for reversing the wettability of quartz wet with Cha Cha Gallup crude oil. In fact, both of these agents made the surface more oil wettable. These tests do not mean, however, that these chemicals would not be effective in other reservoir systems or in the Cha Cha Gallup reservoir under other conditions.

Other chemicals tested are listed in Table II. All of these chemicals, at the pH and concentration listed, failed to change the contact angle one way or the other by more than about 5 degrees.

*Table II*

| Test No. | Chemical | Molarity | pH |
|---|---|---|---|
| 1 | Sodium chloride | 2.5 | 7.6 |
| 2 | Sodium hydroxide | 0.5 | 12. |
| 3 | Sodium silicate | 0.5 | 12. |
| 4 | Na$_2$CO$_3$ | 0.5 | Not determined |
|  | (NH$_4$)$_2$ HPO$^4$ | 0.5 |  |
| 5 | Sodium sulfite | 0.5 | 9.7 |
| 6 | Sodium tripolyphosphate | 0.2 | 9.4 |
| 7 | Ammonium carbonate | 0.5 | 8-11 |
| 8 | Sodium thiosulfate | 0.5 | 8.3 |
| 9 | Sodium chloride | 2.0 | 9.5 |
|  | Ammonium sulfide | 0.5 |  |
|  | Ammonium carbanate | 0.5 |  |

Tests 1, 2, 3, 4, 6 and 7 show that chemicals such as the chlorides, hydroxides, carbonates, silicates, and phosphates, which have been previously used as flooding water additives, were not effective in changing the wettability of quartz wetted by Cha Cha Gallup crude oil. Neither were the sulfite and thiosulfate listed in Tests 5 and 8. These particular chemicals have not been previously effective to improve oil recovery in water flooding operations. My co-pending application Serial No. 284,902 filed June 3, 1963, discloses in more detail and claims the use of sulfites as additives to flooding water.

Test 9 of Table 2 is of particular interest since it shows that the presence of other salts, such as sodium chloride, may influence the effectiveness of the sulfides in changing the wettability of a surface in contact with a particular crude oil. This emphasizes the importance of using in the tests, whether contact angle or flow tests, water as similar as possible to the water available for use in the flooding operation.

It is also significant that similar contact angle measurements show that sulfides are effective in changing the wettability of quartz in contact with some other crude oils, but not with all other crude oils. For example, an ammonium sulfide solution 0.5 molar with the sulfide and at a pH of 9.5 only slightly changed the wettability of quartz in contact with crude oil from the Tensleep formation of the Salt Creek field, Wyoming. A solution 0.5 molar with ammonium sulfide and also 0.5 molar with ammonium carbonate and at a pH of 9.5 made the quartz surface more oil wettable than did the naturally occurring brine when in contact with the Tensleep crude oil.

A solution 0.5 molar in ammonium sulfide and 0.5 molar in ammonium carbonate and at a pH of 9.4 failed to change the wettability of calcite surface in contact with crude oil from the San Andres limestone of the Fullerton field in Texas.

On the other hand, preliminary results with one other crude oil seemed favorable but are not yet definite.

To confirm the validity of contact angle measurement in determining the usefulness of sulfides as flooding water additives several flow tests were made. In these tests aqueous solutions of sulfides were used to displace Cha Cha Gallup crude oil from porous solids of various sorts. In these tests a column was packed with solid particles passing a number 50 U.S. standard sieve and retained on a number 200 sieve. The packed column had a pore volume of about 100 milliliters. The column was then filled with air-free Cha Cha Gallup oil. In order to establish reservoir-like conditions between the crude oil and the rock, the packs were contacted with the crude oil for a period of from one to four months before flooding. The packs were flooded with water to a moderately high water-to-oil ratio and then with a slug of the solution being tested.

In one test, for example, the solid particles were quartz sand and the tested solution had a pH of 9.9 and was 0.5 molar with ammonium sulfide and also 0.5 molar with ammonium carbonate. The initial water displacement step recovered about 56 percent of the oil. The test solution then displaced an additional 14 percent. When crushed and sieved Cha Cha Gallup cores were substituted for the quartz sand, water displaced about 53 percent of the oil while the sulfide-carbonate solution displaced an additional 22 percent oil.

Still other flow tests indicated that some agents were effective while others were not. The agents were sometimes run in sequence in a single flow test so the results are only qualitative. Therefore no volumes are presented in Table III which simply lists the agents which were effective to increase oil recovery and those which were not.

*Table III*

| Chemical agents | Molarity | pH |
| --- | --- | --- |
| The following agents increased oil recovery: | | |
| (1) Ammonium sulfide | 0.5 | 9.5 |
| +ammonium carbonate | 0.5 | |
| (2) Ammonium sulfide | 1.5 | 8.7 |
| +carbon dioxide | [1] 1.0 | |
| +sodium chloride | 2.7 | |
| (3) Sodium sulfide | [2] 1.0 | 8.6 |
| +hydrogen sulfide | | |
| (4) Sodium sulfide | 0.4 | 8.5 |
| +carbon dioxide | 0.5 | |
| (5) Sodium phosphate | 0.5 | 3.8 |
| The following agents failed to increase oil recovery: | | |
| (6) Sodium tripolyphosphate | 0.3 | 10.0 |
| +sodium carbonate | 0.4 | |
| (7) Ammonium sulfide | 0.5 | 10.0 |
| (8) Sodium sulfite | 0.5 | 11.4 |
| +sodium carbonate | 0.5 | |

[1] Approximately.
[2] Sulfide.

A comparison of the results of flow tests as shown in Table III with the results of contact angle measurements shown in Tables I and II reveals that the two testing methods are in agreement with one possible exception. This apparent exception involves Test 9 of Table II and chemical agents 2 of Table III. The presence of the higher concentration of ammonium sulfide in the flow test was apparently able to overcome the adverse effects of sodium chloride.

In a flow test using ground limestone saturated with crude oil from the Abo Reef of the Empire Abo field in New Mexico, water containing 0.65 mole of ammonium sulfide and 0.35 mole of ammonium carbonate at a pH of 9.6 increased oil recovery. Unfortunately no contact angle measurements are available for comparison.

As a still further confirmation of the reliability of the contact angle measurements to predict the behavior of sulfides in increasing oil recovery, a flow test was made using an actual core from the Cha Cha Gallup formation. The core was 3.5 inches in diameter and 4.2 inches long.

Prior to flooding, a pseudo-connate water saturation of about 11.2 percent pore volumn was established. Air-free crude oil was circulated through the core at reservoir temperature for more than 400 hours. After circulation of oil the core was flooded with sulfide-free water until a water-to-oil ratio of about 6 to 1 was reached. At this point the oil recovery amounted to about 17 percent of the pore volume. A volume of sulfide solution 1.0 molar with ammonium sulfide 1.5 molar with sodium chloride and with the pH adjusted by carbon dioxide to about 8.7 was then injected. This sulfide solution amounted to about 22 percent of the pore volume. It was displaced through the core by sulfide-free water.

As the sulfide solution passed through the core, the water-to-oil ratio dropped to 1 to 1 and then began to rise again. The ratio again reached a value of 6 to 1 after an additional 15.5 percent pore volume of oil had been displaced by the sulfide solution. This would seem to indicate clearly the ability of the sulfide solution, selected by means of contact angle measurements, to improve oil recovery from the Gallup sand of the Cha Cha Gallup field.

The core flow test also seems to indicate that several adverse effects of sodium chloride can be avoided in the case of Cha Cha Gallup crude oil by using a ratio of sodium chloride to ammonium sulfide no greater than about 2 to 1. For other crude oils and other formations, the ratio will probably be somewhat different. While a water-to-oil ratio of 6 to 1 was used in this particular test as the point at which the sulfide solution was injected, it is usually preferred in the test to continue introduction of the first flooding water until a ratio of about 10 to 1 is reached.

In some cases the naturally occurring water in the formation may contain a concentration of sodium chloride high enough to interfere with the action of the sulfide. In such cases it may be desirable to inject ahead of the sulfide solution a batch or slug of water containing less sodium chloride, or perhaps none at all. This batch of fresher water then displaces the connate brine and avoids the adverse effects of the high sodium chloride content. When flow tests are made in the laboratory to determine if increased oil recovery can be expected by use of a sulfide solution, the water which is first forced through the core should be as similar as possible to that which will immediately precede the sulfide solution in the flooding operation. This may be either the naturally occurring water in the formation, a synthetic formation water, a batch of water injected to protect the sulfide solution or it may be flooding water which has already been in use for some time before the sulfide solution is injected. If a sample of the water which will immediately precede the sulfide solution is not available in the flow test, then a solution should be used having a composition as similar as possible to this water.

It should be noted that the flow tests described above involve short paths of travel. In actual field use, however, if the chemical is strongly adsorbed by the formation, the additive may progress only a few feet from the input well before it is lost from the flooding water.

One advantage of using sulfides is that many formation waters from oil-bearing reservoirs contain sulfides, indicating that the solid surfaces are saturated with these chemicals. The concentration of sulfides in naturally occurring formation brines, however, is ordinarily much less than that required to cause a substantial increase in water wettability. The higher concentration of sulfides will not, of course, be in equilibrium with the formation pore surfaces so sulfides may be lost. The degree of loss will depend upon the mineral content of the formation. Tests have shown that if a formation is relatively free from sulfides and contains minerals highly reactive with sulfides, loss of these agents may be high. Once the surfaces have been exposed to sulfides, however, further loss of sulfides is not serious.

If an ammonium sulfide is used, and if the formation contains considerable clays, loss of the ammonium ion may occur due to exchange with sodium ion in the clays. For this reason it is usually advisable to maintain some sodium chloride in the ammonium sulfide flooding water, particularly when control of pH is important. As noted above, however, the concentration of sodium chloride should not be much greater than about twice that of the ammonium sulfide, at least in the case of the Cha Cha Gallup crude oil, to avoid the adverse effects which sodium chloride sometimes has on the wettability effects of sulfides.

Certain variations in techniques are possible within the scope of my process. For example, if a formation has originally been flooded with water, the oil phase may have become at least partially discontinuous. That is, the remaining oil may exist as isolated droplets in the pores or as spots on the formation surface. To re-establish good oil continuity and thus permit better flow of oil through the formation as the sulfide solution advances, it may be advisable to inject what is sometimes called a bank or batch or slug of oil ahead of the sulfide solution. The bank of oil may also follow the sulfide solution and precede the ordinary flooding water used to displace the sulfide solution through the formation.

The size of the oil bank may be as little as 1 or 2 percent of the pore volume of the portion of the reservoir expected to be flooded. The oil bank should grow in volume as it picks up oil left behind by the previous flooding operation so injection of a large bank is not required.

Whether an oil bank is used or not, the volume of the sulfide solution should also ordinarily be at least about 1 percent of the pore volume expected to be flooded. Preferably the sulfide solution should be from about 2 to 20 percent of this volume. A comprise is often necessary between a high concentration and a large volume of solution to keep the process within economic limits.

As shown in the tests, carbonates may accompany the sulfides if desired. This is convenient since introducing carbon dioxide is a good way to adjust the pH. It is usually preferred that an amount of carbonates approximately equal, on a molar basis, to the concentration of sulfides should be used. This is not only because the carbonates act as buffers to control the pH of the solution but also because the carbonates, particularly ammonium carbonates, sometimes aid in increasing the water wettability of the formation. The carbonate may precede, accompany or follow the sulfide, but it is preferred, ordinarily, that the carbonate and sulfide solution be injected simultaneously in a single solution.

Sulfide and carbonate salts are readily available on the market in many parts of the country. If a sour oil or gas field is near the field to be flooded, however, it may be more economical to prepare the salts in the field. This can be done by absorbing the hydrogen sulfide and carbon dioxide in the sour or acid gas by contacting the gas with a solution of sodium hydroxide or ammonium hydroxide.

Many variations are possible in this absorption operation. If the absorbing liquid is a sodium hydroxide solution, the gas may be simply introduced through a sparger tube in the bottom of a small tank filled with the hydroxide. A packed absorption column or an absorption column with plates and bubble caps may also be used if desired.

If the ammonium salts are to be prepared, it may be advisable to inject a small stream of ammonia into the sour or acid gas before it enters the absorber or at a level considerably below the top of the absorber. The water is introduced into the top of the absorber to dissolve the ammonium salts and carry them out the bottom of the absorber. This technique has the advantage of avoiding loss of the volatile ammonia. Many other special systems will occur to those skilled in the art.

If the sour gas has considerably more carbon dioxide than sulfide, it may be advisable to avoid absorption of all the carbon dioxide in order to reduce the requirement, and thus the expense, of the sodium hydroxide or ammonia. Even though carbonic acid is a stronger acid than hydrogen sulfide, it is possible to absorb a higher percentage of hydrogen sulfide than carbon dioxide by decreasing the time of contact between the gases and absorption liquid. The reason, apparently, is that the hydrogen sulfide reacts with a base as soon as the hydrogen sulfide dissolves in the water. The carbon dioxide, on the other hand, must first react with water to form carbonic acid before it can ionize and react with the base.

The above descriptions and variations are given by way of example. Many additional variations falling within the scope of the following claims will occur to those skilled in the art.

I claim:

1. A process for water flooding an oil-bearing formation penetrated by at least one injection well and at least one producing well comprising introducing into said formation through said injection well an aqueous solution having a pH of at least about 6 and containing a sulfide salt selected from the group consisting of ammonium sulfides and alkali metal sulfides in a concentration at least about 0.1 molar with respect to said sulfide salt, the volume of said aqueous solution being at least about 1 percent of the pore volume expected to be flooded, and producing oil from said at least one producing well.

2. The process of claim 1 in which said solution contains, in addition to said sulfide salt, a carbonate salt selected from the group consisting of ammonium carbonates and alkali metal carbonates.

3. A process for water flooding an oil-bearing formation penetrated by at least one injection well and at least one producing well comprising introducing into said formation through said injection well an aqueous solution having a pH between about 8 and about 10 and containing a sulfide salt selected from the group consisting of ammonium sulfides and alkali metal sulfides in a concentration between about 0.2 and 1.0 molar with respect to said sulfide salt, the volume of said aqueous solution being between about 2 and about 20 percent of the pore volume expected to be flooded, and recovering oil from said at least one producing well.

4. A process for water flooding an oil-bearing formation penetrated by at least one injection well and at least one producing well comprising introducing into said formation through said injection well an aqueous solution of a sulfide salt selected from the group consisting of ammonium sulfides and alkali metal sulfides, the concentration of said sulfide salt and the pH of said solution being sufficient to make said formation more water wettable than it is when in contact with the naturally occurring oil and water in said formation, the volume of said aqueous solution being at least about 1 percent of the pore volume expected to be flooded, and recovering oil from said at least one producing well.

5. The process of claim 4 in which said solution contains, in addition to said sulfide salt, a carbonate salt selected from the group consisting of ammonium carbonates and alkali metal carbonates.

6. An improved method for recovering oil from an oil-bearing permeable solid material characterized by being an oil-bearing earth formation comprising introducing into said material through an input means an aqueous solution having a pH of at least about 6 and containing a sulfide salt selected from the group consisting of ammonium sulfides and alkali metal sulfides in a concentration at least about 0.1 molar with respect to said sulfide salt the volume of said aqueous solution being at least about 1 percent of the pore volume of said solid material to be flooded, and withdrawing oil from said material through an output means.

7. The process of claim 6 in which said solution contains, in addition to said sulfide salt, a carbonate salt selected from the group consisting of ammonium carbonates and alkali metal carbonates.

8. An improved method for recovering oil from an oil-bearing permeable solid material characterized by being an oil bearing earth formation comprising introducing into said material through an input means an aqueous solution having a pH between about 8 and about 10 and containing a sulfide salt selected from the group consisting of ammonium sulfides and alkali metal sulfides in a concentration between about 0.2 and about 1.0 molar with respect to said sulfide salt, and withdrawing oil from said solid material through an output means, the volume of said aqueous solution being between about 2 and about 20 percent of the pore volume of said solid material to be flooded.

9. A process for water flooding the Gallup formation of the Cha Cha field in New Mexico and equivalents thereof, comprising introducing into such formation through an injection well an aqueous solution having a pH between about 8 and about 10 and containing a sulfide salt selected from the group consisting of ammonium sulfides and alkali metal sulfides in a concentration between about 0.2 and about 1.0 molar with respect to said sulfide salt, the volume of said aqueous solution being between about 2 and about 20 percent of the pore volume expected to be flooded, and producing oil from at least one producing well penetrating said formation.

10. The process of claim 9 in which said solution contains, in addition to said sulfide salt, a carbonate salt selected from the group consisting of ammonium carbonates and alkali metal carbonates.

11. A process for water flooding an oil-bearing formation penetrated by at least one injection well and at least one producing well comprising obtaining an airfree sample of oil from said formation, placing said oil in contact with a smooth, solid surface having a composition substantially the same as that of the surface exposed to the oil and water within said formation, placing in contact with said oil and said solid surface a first water solution at least similar to that present in said formation, measuring a first equilibrium contact angle of the oil-water interface with said solid surface, replacing said first water solution with a second water solution containing a sulfide selected from the group consisting of ammonium sulfides and alkali metal sulfides, measuring a second equilibrium contact angle of the oil-water interface with said solid surface, introducing into said formation through said injection well an aqueous solution having substantially the composition of said second water solution, makes said formation more water wettable than said first water solution, the volume of said aqueous solution introduced into said formation being at least about 1 percent of the pore volume expected to be flooded, and producing oil from said at least one producing well.

12. The process of claim 11 in which said second solution contains, in addition to said sulfide salt, a carbonate salt selected from the group consisting of ammonium carbonates and alkali metal carbonates.

13. A process for waterflooding an oil-bearing formation penetrated by at least one injection well and at least one producing well comprising introducing down said at least one injection well and into said formation an aqueous solution of a sulfide salt selected from the group consisting of ammonium sulfides and alkali metal sulfides, the volume of said aqueous solution being at least about 1 percent of the pore volume expected to be flooded, the concentration of said sulfide salt and the pH of said solution being sufficient to cause said solution to provide an increased oil recovery from said formation, as determined by a flooding test in a core from said formation said core containing air-free oil from said formation, said core being flooded first to a water-to-oil ratio of about 10 to 1 with water as similar as possible to the water which will immediately precede said aqueous solution in the formation, and said core then being flooded by said aqueous solution, and producing oil from said at least one producing well.

14. The process of claim 13 in which said solution contains, in addition to said sulfide salt, a carbonate salt selected from the group consisting of ammonium carbonates and alkali metal carbonates.

15. A process for water flooding an oil-bearing formation penetrated by at least one injection well and at least one producing well comprising introducing into said formation through said injection well an aqueous solution having a pH of at least about 6 and containing an ammonium sulfide in a concentration at least about 0.1 molar with respect to said ammonium sulfide, the volume of said aqueous solution being at least about 1 percent of the pore volume expected to be flooded, and producing oil from said at least one producing well.

16. The process of claim 15 in which said solution contains an ammonium carbonate in addition to said ammonium sulfide.

17. The process of claim 15 in which said solution contains sodium chloride in addition to said ammonium sulfide to decrease loss of ammonium ions to clays by ion exchange, the concentration of said sodium chloride being not much greater than about twice that of the ammonium sulfide.

18. A process for water flooding an oil-bearing formation penetrated by at least one injection well and at least one producing well comprising introducing into said formation through said injection well an aqueous solution having a pH between about 8 and about 10 and containing an ammonium sulfide in a concentration between about 0.2 and about 1.0 molar with respect to said ammonium sulfide, the volume of said aqueous solution being between about 2 and about 20 percent of the pore volume expected to be flooded, and producing oil from said at least one producing well.

19. The process of claim 18 in which said solution contains an ammonium carbonate in addition to said ammonium sulfide.

20. The process of claim 18 in which said solution contains sodium chloride in addition to said ammonium sulfide to decrease loss of ammonium ions to clays by ion exchange, but the ratio of sodium chloride to ammonium sulfate is not greater than about 2 to 1 on a molar basis to avoid excessive adverse effects of said sodium chloride.

References Cited by the Examiner

UNITED STATES PATENTS 3,120,262  2/64  Archer _____ 166—9
3,163,213  12/64  Bernard _____ 166—9

BENJAMIN HERSH, *Primary Examiner.*

CHARLES E. O'CONNELL, *Examiner.*

UNITED STATES PATENT OFFICE
CERTIFICATE OF CORRECTION

Patent No. 3,203,480                          August 31, 1965

H Robert Froning

It is hereby certified that error appears in the above numbered patent requiring correction and that the said Letters Patent should read as corrected below.

Column 9, line 28, after "solution," insert -- when the equilibrium contact angles indicate said second water solution --.

Signed and sealed this 5th day of April 1966.

(SEAL)
Attest:

ERNEST W. SWIDER                          EDWARD J. BRENNER
Attesting Officer                            Commissioner of Patents

UNITED STATES PATENT OFFICE
CERTIFICATE OF CORRECTION

Patent No. 3,203,480                                                  August 31, 1965

H Robert Froning

It is hereby certified that error appears in the above numbered patent requiring correction and that the said Letters Patent should read as corrected below.

Column 9, line 28, after "solution," insert -- when the equilibrium contact angles indicate said second water solution --.

Signed and sealed this 5th day of April 1966.

(SEAL)
Attest:

ERNEST W. SWIDER                                EDWARD J. BRENNER
Attesting Officer                                      Commissioner of Patents